United States Patent [19]

DelMastro et al.

[11] Patent Number: 4,549,058
[45] Date of Patent: Oct. 22, 1985

[54] FEATHER SEAL SLOT FOR VANES

[75] Inventors: Bartolomeo P. DelMastro, Manchester; Frederick Eckart, Southington, both of Conn.

[73] Assignee: United Technologies Corporation, Hartford, Conn.

[21] Appl. No.: 537,915

[22] Filed: Sep. 30, 1983

[51] Int. Cl.$^4$ ............................................. B23K 26/00
[52] U.S. Cl. ...................... 219/121 LC; 219/121 ED; 219/121 EC; 219/121 LD
[58] Field of Search ................. 219/121 LC, 121 LD, 219/121 EC, 121 ED

[56] References Cited

U.S. PATENT DOCUMENTS 3,617,685  11/1971  Brill-Edwards et al. .... 219/121 ED

FOREIGN PATENT DOCUMENTS 0029243  3/1978  Japan ........................... 219/121 LD
0066841  6/1978  Japan ........................... 219/121 LD
0008178  4/1979  Japan ........................... 219/121 LD Primary Examiner—C. L. Albritton
Attorney, Agent, or Firm—Norman Friedland

[57] ABSTRACT

The slots for accommodating feather seals in the turbine vanes of a gas turbine engine has the end thereof sealed off by use of weld wire inserted into the slot and simultaneously welded and cut to the required length.

3 Claims, 4 Drawing Figures

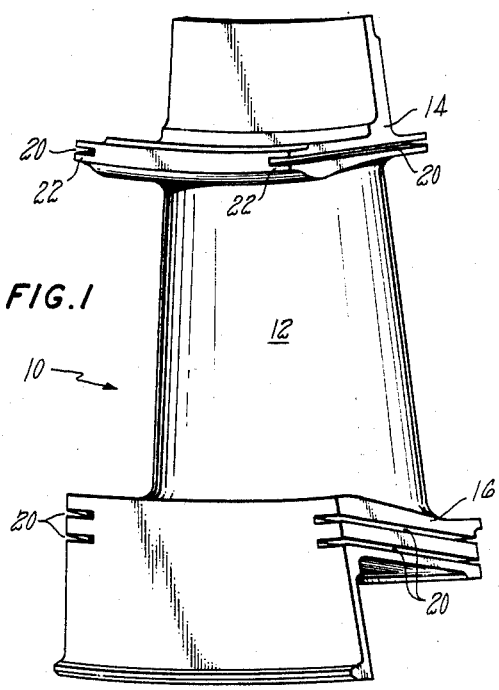
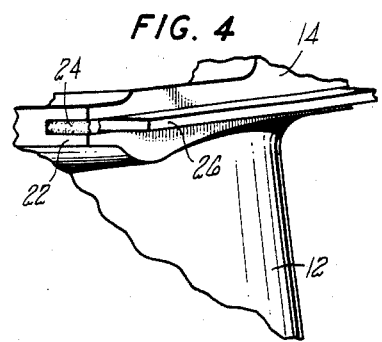
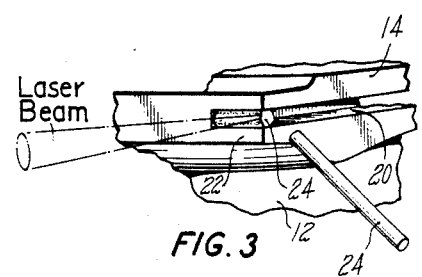
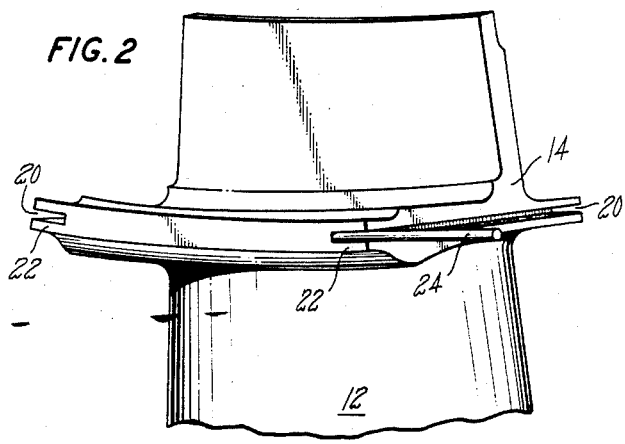

FEATHER SEAL SLOT FOR VANES

TECHNICAL FIELD

This invention relates to gas turbine engines and particularly to the seals for turbine vanes.

BACKGROUND ART

As is well known, it is customary to utilize feather seals that fit into slots formed in the edge of the buttresses of the vanes of the turbine. Heretofore, the slots defining the receptacles for these feather seals were formed by well known electrical discharge machines that are controllable the extent of the slot. Hence, the slot was made so that it did not extend beyond the edge of the side surface. It has been found that improved sealing can be obtained by another method (creep grinding) for fabricating the slot. However, the creep grinding operation inherently requires that the end wall of the slot is penetrated and hence opened leaving a leakage path. Obviously the leakage path had to be sealed and the heretofore method of sealing these ends was to insert a small sheet metal stop that was welded in place. Typically the stop had to be held in place while the welding operations took place. This was a cumbersome and time-consuming operation.

We have found that we can retain the creep grinding operation with its attendant smoother and, hence, better sealing surface by inserting the end of weld wire whose diameter equals the width of the slot and is longer than the depth of the slot and using a laser or electron beam to cut the weld wire at the slot seal surface. The heat generated by the laser serves both to cut and weld the wire into place and hence closing off the end of the slot and thus, eliminating the leakage thereof.

DISCLOSURE OF INVENTION

An object of this invention is to seal off the ends of a feather slot that was machined into the buttress of the vane of a turbine stator vane assembly for a gas turbine engine by the creep grinding process. A feature of the invention is to insert welding stock into the end of the groove at the location to be sealed and by use of a laser to cut and weld in a simultaneous operation.

Other features and advantages will be apparent from the specification and claims and from the accompanying drawings which illustrate an embodiment of the invention.

BRIEF DESCRIPTION OF DRAWINGS

FIG. 1 is a front elevation view of a typical vane for a turbine stator of a gas turbine engine.

FIG. 2 is a partial view of FIG. 1 showing the ends of the feather seal slot closed.

FIG. 3 is an enlarged partial view illustrating the method of closing off the end of the feather seal slot, and FIG. 4 is a view of FIG. 3 after the end is closed and the feather seal installed.

BEST MODE FOR CARRYING OUT THE INVENTION

Referring now to all the Figures, the vane is generally illustrated by reference numeral 10 comprising the airfoil section 12 sandwiched between the upper buttress 14 and lower buttress 16. This is a typical design of a vane and for further details of the construction thereof reference should be made to the models JT-80, JT-9 and PW-2037 engines manufactured by the Pratt & Whitney Aircraft Division of United Technologies Corporation, the assignee of this patent application. A plurality of similar vanes are mounted into a ring, the ends of the buttress abut adjacent buttresses of the next adjacent vane. Also, as is typical, feather seals are mounted into transverse slots and serve to assure that the flow of air is confined between the adjacent air foil sections.

According to this invention slots 20 are machined into the side surfaces of buttresses 14 and 16 by a well known creep grinding process and as indicated in FIG. 1 the end 22 as viewed from the front face of the buttress are exposed or opened. Obviously, this is because in the creep grinding process, the grinding which makes but a single pass along the extent of the slot could not be stopped short of the end without having an undesirable mounting profile for the feather seal.

To close the end of the slot as viewed in FIGS. 2 and 3 a weld wire 24 is inserted into the slot at the end and a laser beam follows the wire along its juncture in the slot and when the beam reaches the end of the buttress it is energized further to cut the wire, as shown. A suitable laser is the Raytheon CNC 4 axis pulse YAG laser commercially available from the Raytheon Company. The wire may be fed manually or automatically depending on the particular application.

As shown in FIG. 4 the feather seal 26 fits into slot 20 and abuts the inner surface of the welded wire.

It should be understood that the invention is not limited to the particular embodiments shown and described herein, but that various changes and modifications may be made without department from the spirit and scope of this novel concept as defined by the following claims.

We claim:

1. The method of fabricating a seal between turbine vane segments forming a ring of turbine vanes of a gas turbine engine and sealing off the end of the open ended slot formed in the side face of the buttress that retains a feather seal of the turbine vane of a gas turbine engine comprising the steps of:

grinding by creep grinding a slot extending in the side face of the buttress, and inserting a weld wire dimensioned to fit the slot adjacent the edge intended to be sealed, and impinging high energy beam generated from a powered energy source along the edge of the weld wire adjacent the juncture where the weld wire abuts the wall of the slot to weld the weld wire to the buttress, and sequentially cutting the weld wire at the end of the slot by the high energy beam emanating from the powered energy source so that the weld wire seals off the end of the slot at the edge.

2. The method claimed in claim 1 wherein the steps of impinging and cutting is by use of a laser beam.

3. A buttress for a vane of a gas turbine engine having an open-ended slot extending along a side surface, said slot adapted to receive a feather seal to seal between adjacent vanes, means at the edge of said slot for closing off the end of said slot including a weld wire dimensioned to fit into the slot adjacent the end, and means for sequentially welding and cutting said weld wire with the use of a laser whereby said weld wire seals off the end of said open ended slot.

* * * * *

UNITED STATES PATENT AND TRADEMARK OFFICE
CERTIFICATE OF CORRECTION

PATENT NO. : 4,549,058

DATED : October 22, 1985

INVENTOR(S) : Bartolomeo P. DelMastro & Frederick Eckart

It is certified that error appears in the above-identified patent and that said Letters Patent is hereby corrected as shown below:

Column 2, line 1 "JT-80" should be --JT-8D--.

Column 2, line 1 "JT-9" should be --JT-9D--.

Column 2, line 34 "department" should be --departing--.

Signed and Sealed this

Twenty-ninth Day of July 1986

[SEAL]

Attest:

DONALD J. QUIGG

Attesting Officer

Commissioner of Patents and Trademarks